US007915752B2

(12) United States Patent
Mlaker

(10) Patent No.: US 7,915,752 B2
(45) Date of Patent: Mar. 29, 2011

(54) APPARATUS FOR ENABLING AN AERIAL LIFT INCLUDING A SELF-DISABLING INTERLOCK

(75) Inventor: John Mlaker, West Allis, WI (US)

(73) Assignee: Utility Truck Equipment & Parts, LLC, Pewaukee, WI (US)

(*) Notice: Subject to any disclaimer, the term of this patent is extended or adjusted under 35 U.S.C. 154(b) by 197 days.

(21) Appl. No.: 12/405,391

(22) Filed: Mar. 17, 2009

(65) Prior Publication Data

US 2010/0237692 A1 Sep. 23, 2010

(51) Int. Cl.
*B60L 1/00* (2006.01)
(52) U.S. Cl. .......................................................... 307/9.1
(58) Field of Classification Search .................... 307/9.1
See application file for complete search history.

(56) References Cited

U.S. PATENT DOCUMENTS

| | | | | |
|---|---|---|---|---|
| 3,854,616 | A * | 12/1974 | Willis et al. | 414/607 |
| 4,007,847 | A | 2/1977 | Marco | |
| 4,027,801 | A | 6/1977 | Johnston et al. | |
| 4,124,226 | A | 11/1978 | Phillips | |
| 5,064,022 | A | 11/1991 | Graham | |
| 5,577,876 | A * | 11/1996 | Haeder et al. | 414/699 |
| 5,780,936 | A | 7/1998 | Cardello | |
| 5,875,869 | A | 3/1999 | Busuttil et al. | |
| 5,890,559 | A | 4/1999 | Busuttil et al. | |
| 6,104,098 | A | 8/2000 | Cardello | |
| 6,226,902 | B1 * | 5/2001 | Heyne | 37/348 |
| 6,481,749 | B2 | 11/2002 | Ahlers et al. | |
| 6,755,258 | B1 * | 6/2004 | Hunke et al. | 169/24 |
| 6,877,773 | B1 | 4/2005 | Bibb et al. | |
| 7,277,782 | B2 * | 10/2007 | Yakes et al. | 701/22 |
| 7,283,903 | B2 * | 10/2007 | Merten et al. | 701/50 |
| 7,711,460 | B2 * | 5/2010 | Yakes et al. | 701/22 |
| 2003/0066659 | A1 * | 4/2003 | Bissen et al. | 169/47 |
| 2004/0099453 | A1 * | 5/2004 | Guy | 180/65.1 |
| 2007/0288131 | A1 * | 12/2007 | Yakes et al. | 701/22 |

* cited by examiner

*Primary Examiner* — Jared J Fureman
*Assistant Examiner* — Adi Amrany
(74) *Attorney, Agent, or Firm* — Boyle Fredrickson, S.C.

(57) ABSTRACT

The present invention provides a control circuit for enabling an aerial boom on an aerial lift truck having stabilizing members. The control circuit includes a selector switch to enable the auxiliary member and an interlock portion preventing the auxiliary member from being enabled if each of the stabilizing members is not in an operative position. The control circuit further includes an interlock over ride. The interlock over ride may be activated when the selector switch is attempting to enable the auxiliary member and remains activated until the selector switch disables the auxiliary member. Thus, the interlock over ride permits an operator to bypass the interlock during a single operation of the auxiliary member and prevents bypass from remaining active during subsequent operations of the auxiliary member.

13 Claims, 2 Drawing Sheets

APPARATUS FOR ENABLING AN AERIAL LIFT INCLUDING A SELF-DISABLING INTERLOCK

BACKGROUND OF THE INVENTION

Figure 1:
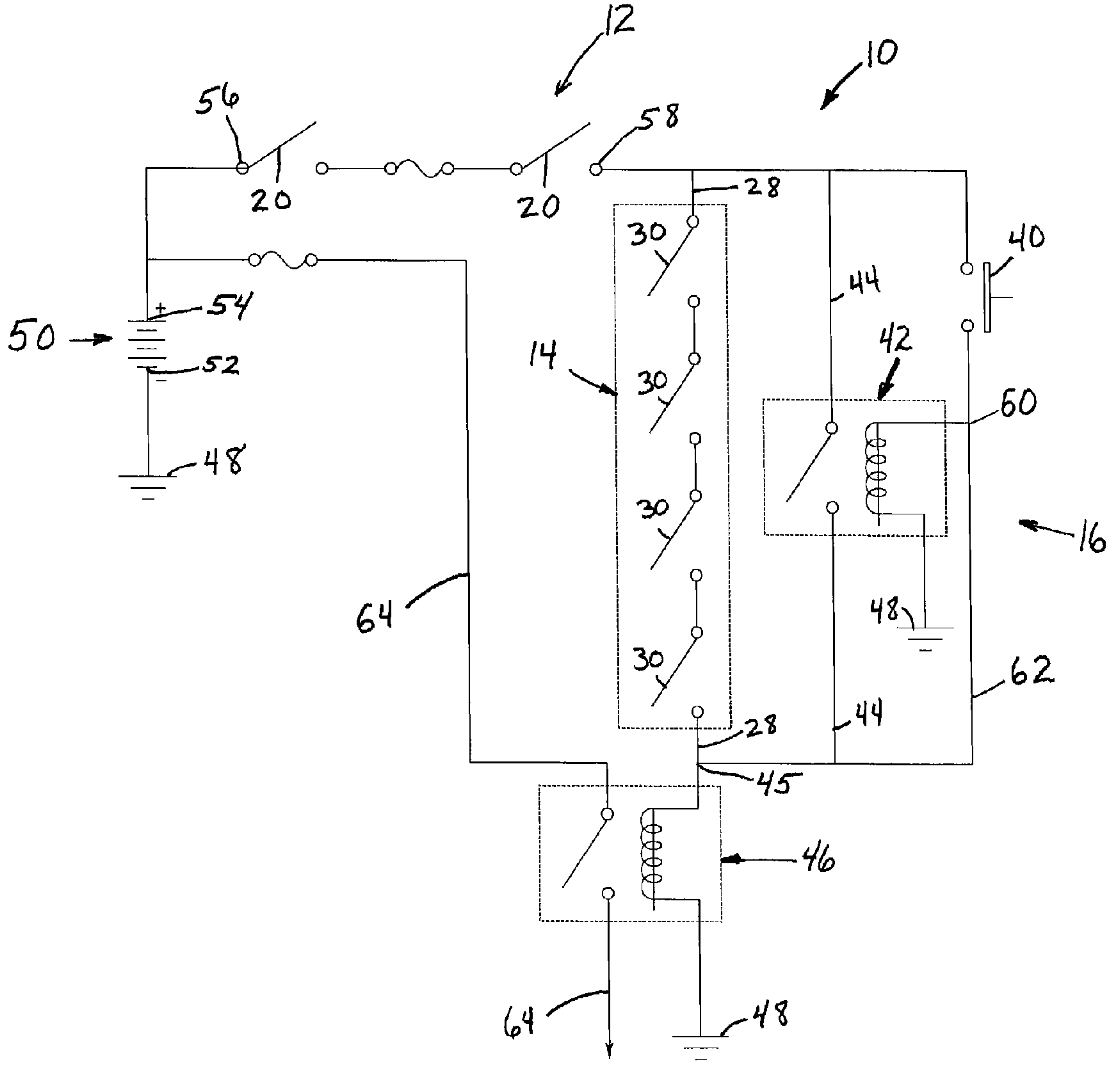

The subject matter disclosed herein relates to a control circuit for enabling an aerial lift member. Specifically, a control circuit for enabling an aerial lift member including an interlock portion and an over ride of the interlock portion including a self-disabling over-ride switch is disclosed.

As is known to those skilled in the art, some mobile vehicles have an auxiliary member which may be extended away from the main body portion of the vehicle. For example, aerial lift trucks may include a boom that can be extended upward and can be rotated up to a continuous 360 degrees of rotation; fire trucks may include an extension ladder that, similarly, may be extended upward and rotated about the vehicle; and construction equipment may include a digging member extending away from the front or rear of the vehicle. In each example, the center of gravity of the vehicle changes as the auxiliary member is extended away from or rotated around the vehicle, creating a potential for the vehicle to tip over.

Stabilizing members are typically provided on those mobile vehicles having an auxiliary member to prevent the vehicle from tipping over while the auxiliary member is in operation. Such stabilizing members, also known as outriggers, may be extended and retracted. In the retracted position, the stabilizing member is stored, typically adjacent to the body of the vehicle, such that the stabilizing member does not interfere with the mobility of the vehicle. In the extended position, the stabilizing member is positioned away from the body of the vehicle such that the stabilizer pad engages the ground, or other solid surface, to stabilize the vehicle when the auxiliary member is in operation.

An interlock, preventing activation of the auxiliary member, is typically provided in order to ensure that the stabilizing members are extended prior to operating the auxiliary member. Typically, the auxiliary member is manually enabled and disabled by an operator, for example by a switch, lever, or push-button. Enabling the auxiliary member engages actuators, such as relays, solenoids, or valves to provide electrical or hydraulic power, as required by the auxiliary member, and permits motion of the auxiliary member. In order to determine whether the stabilizing members are extended, each stabilizing member has a sensor or a switch associated with that stabilizing member indicating whether the stabilizing member is extended. The sensor or switch interlocks activation of the auxiliary member such that it may not be enabled until each of the stabilizing members is fully extended and engaging the ground.

However, such an interlock presents potential disadvantages. For example, the mobile vehicle may be parked on a sloped surface or next to a curb on a street. On such surfaces, the stabilizing member may engage the ground yet not be fully extended. Consequently, the sensor on the stabilizing member indicates that stabilizing member is not fully extended and prevents the auxiliary member from operating. Alternately, one of the sensors or stabilizing members may fail and similarly prevent the sensor from indicating that the stabilizing members are extended. As still another example, the mobile vehicle may be in a garage for service. The auxiliary member may need to be operated while in the garage but there may be no room to extend the stabilizing member. In each example, an operator could determine that the auxiliary member is safe to operate but, nevertheless, be prevented from operating the auxiliary member by the interlock.

In an attempt to overcome this disadvantage, some mobile vehicles provide an over ride for the interlock system, permitting the operator to determine whether the auxiliary member is safe to operate. However, such over rides are typically a maintained style of switch, such as a toggle or selector switch that remains active until the switch is returned to its previous state. Such an over ride switch may inadvertently be left on by the operator after the operation of the auxiliary member is complete, causing an interlock from the stabilizing members to be ignored the next time the auxiliary member is in use. Alternately, if vehicles are not equipped with an over ride, the operator may install a jumper, or a wire, around the interlock portion of the control in order to permit operation of the auxiliary member. Again, the jumper may inadvertently be left on after operating the auxiliary member, causing the interlock of the stabilizing members to be bypassed at the next operation of the auxiliary member.

Therefore, it is desirable to provide an interlock over ride that permits an operator to bypass the interlock during a single operation of the auxiliary member and prevents the bypass from remaining active during subsequent operations of the auxiliary member.

SUMMARY OF THE INVENTION

Consistent with the foregoing and in accordance with the subject matter as embodied and broadly described herein, a self-disabling interlock over ride is described in suitable detail to enable one of ordinary skill in the art to make and use the invention.

The present invention provides a control circuit for enabling an auxiliary member of a mobile vehicle, preferably an aerial boom on an aerial lift truck, having stabilizing members, or outriggers. The control circuit includes a selector switch for enabling the auxiliary member and an interlock portion that may prevent the auxiliary member from being enabled if one of the stabilizing members is not in an operative position. The control circuit further includes an interlock over ride. The interlock over ride may be activated if the enable switch is selecting to enable the auxiliary member. The interlock over ride permits the auxiliary member to be enabled even if the interlock portion is attempting to prevent the auxiliary member from being enabled. The interlock over ride is, in turn, disabled if the enable selector switch removes the enable signal from the auxiliary member. Thus, the interlock over ride permits an operator to bypass the interlock while the auxiliary member remains active and prevents the bypass from remaining active and inadvertently overriding the interlock during subsequent operations of the auxiliary member.

In one embodiment of the present invention, an interlock device is provided on a mobile vehicle having an auxiliary member, which extends away from the vehicle, and at least one stabilizing member. The auxiliary member is selectively enabled and disabled by an enabling means, such as a selector switch. An interlock means selectively prevents the auxiliary member from being enabled, and a bypass means selectively over rides the interlock means. The bypass means is reset when the enabling means disables the auxiliary member.

Thus, it is a feature of the present invention to provide an interlock over ride that remains active only while the auxiliary member remains active, being reset when the auxiliary member is disabled.

In one aspect of the present invention, the interlock means includes a sensor or a switch associated with each stabilizing member. The sensor provides a signal indicating that the stabilizing member is in the operative position. The signal is used to control a relay, and the relays for each of the stabilizing members are connected in series to establish a conductive path. Similarly, the stabilizing member may cause a switch to close when the stabilizing member is in the operative position. Each of the switches may be connected in series to establish a conductive path when all of the stabilizers are in the operative position.

As another aspect of the present invention, the bypass means includes a bypass switch and a bypass relay. If the enabling selector switch is set to enable the auxiliary member, the bypass switch may selectively enable the bypass means. The bypass relay provides a conductive path parallel to the conductive path that may be established by the interlock means.

Thus it is a feature of the present invention that the interlock means and the bypass means provide alternate conductive paths for enabling the auxiliary member.

As still another aspect of the invention, the bypass switch is preferably a momentary switch. The bypass relay is activated to provide the parallel conductive path by pressing the bypass switch when the enabling selector switch selectively enabling the auxiliary member. The bypass relay then remains active until the enabling selector switch selectively disables the auxiliary member.

Thus it is another feature of the present invention that the interlock over ride remains enabled throughout the duration of use of the auxiliary member but is reset when the auxiliary member is no longer enabled.

In another embodiment, the present invention is implemented in a control circuit for enabling an auxiliary member on an aerial lift truck having an auxiliary member, which extends away from the truck, and at least one stabilizing member, or outrigger, which may be extended from the truck to engage the ground. The control circuit includes a voltage source supplying a de voltage and a first switch connected in series with the dc voltage source. An interlock switch is associated with each of the stabilizing members and closes when the stabilizing member is substantially engaging the ground. The interlock switches are connected in series with each other forming an interlock conductive path. The interlock path is connected in series with the first switch. The control circuit further includes a first actuator connected in series with the interlock path selectively providing power to the auxiliary member of the truck.

The control circuit also includes a bypass circuit connected in parallel with the interlock conductive path. The bypass circuit includes a bypass switch connected in series with the first switch and a bypass actuator selectively providing a bypass path parallel to the interlock path between the first switch and the first actuator. The bypass actuator is connected in series with the bypass switch. The bypass circuit also includes a latching signal connected between the bypass path and returning to the bypass actuator such that the actuator remains active until the first switch is opened.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Figure 2:
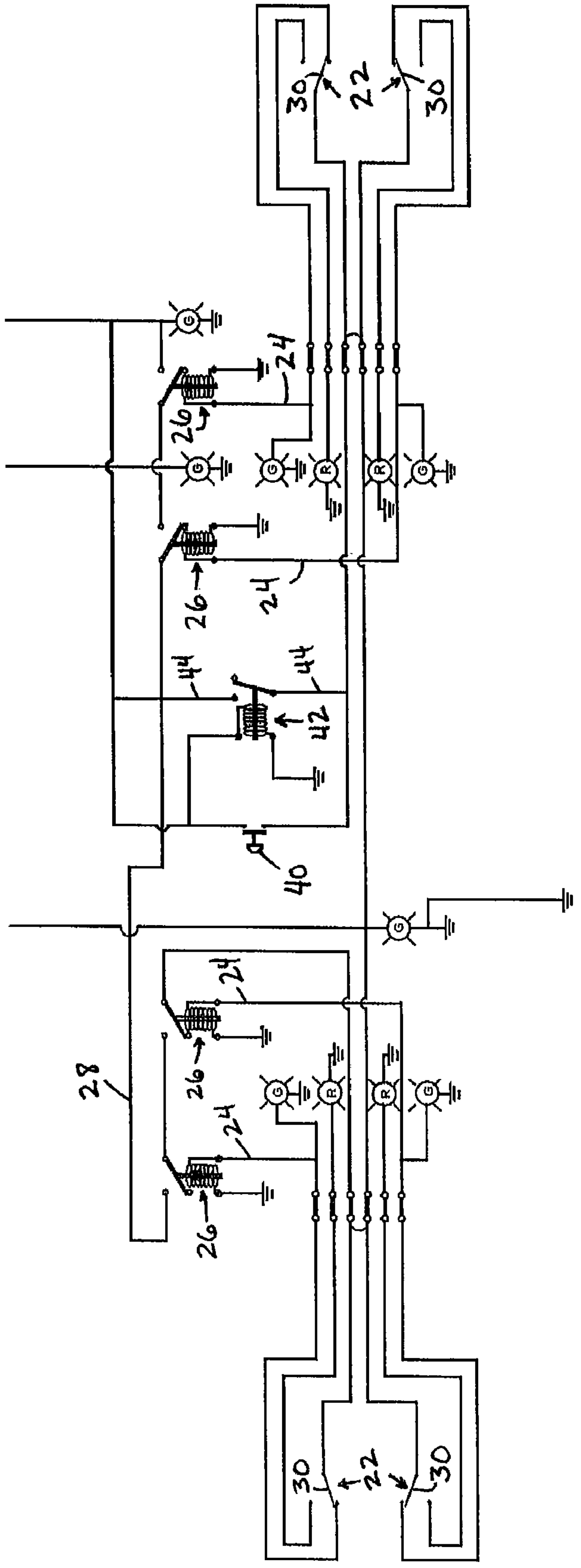

Preferred exemplary embodiments of the subject matter disclosed herein are illustrated in the accompanying drawings in which like reference numerals represent like parts throughout, and in which:

FIG. 1 is a schematic representation of the one embodiment of the present invention; and FIG. 2 is a schematic representation of another embodiment of the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Referring to FIGS. 1 and 2, a control circuit 10 for enabling an auxiliary member of a mobile vehicle having at least one stabilizer member is disclosed. Preferably, the control circuit 10 operates to selectively enable and disable operation of a lift member on an aerial lift vehicle. The control circuit includes a voltage source 50, preferably a twelve volt dc supply such as a truck battery. A first terminal 52 of the voltage source 50 is connected to ground 48 and a second terminal 54 of the voltage source 50 provides the dc voltage.

An enabling means 12, at least partly, enables and disables the auxiliary member of the vehicle. The enabling means 12 may be a selector switch 20. Alternately, the enabling means 12 may be a combination of switches 20, acting in series or parallel as is known in the art. FIG. 1 illustrates two switches 20 combined in series to create the enabling means 12. Preferably, a first switch 20 is the ignition switch of the vehicle and a second switch 20 is a power-take-off (PTO) switch, the two switches working in series to enable the lift member. A first terminal 56 of a selector switch 20 is connected in series to the voltage source 50. A second terminal 58 of the selector switch 20 connects to the interlock means 14 and the bypass means 16.

The interlock means 14 establishes a conductive interlock path 28 connected in series between the second terminal 58 of the selector switch 20 and a first terminal 45 of the first actuator 46. The interlock means 14 includes at least one sensor 22. Each sensor 22 is associated with a stabilizer member on the vehicle and provides a signal 24 indicating when the stabilizer is in the operative position. Preferably, each sensor 22 is a limit switch 30 that is closed when the stabilizer member is extended and engaging the ground. Alternately, each sensor 22 may be any suitable sensor, such as a proximity sensor or pressure switch, and may be connected in any suitable manner, such as closing, opening, or providing an analog voltage to a conductive path, as is known in the art. Preferably, the signal 24 from each sensor 22 controls a relay 26 which, in part, opens or closes the interlock path 28. The output of each relay 26 is connected in series with the other relays 26 such that when each of the stabilizer members is in the operative position the interlock path 28 is established, providing a conductive path between the selector switch 20 and the first actuator 46. Alternately, each sensor 22 may be directly connected in series with the other sensors 22, for example if the sensors 22 are limit switches 30, such that the interlock path 28 is directly established by closing each of the switches 30.

The bypass means 16 establishes a bypass conductive path 44 parallel to the interlock path 28 using a bypass switch 40 and a bypass actuator 42. The bypass switch is connected in series between the selector switch 20 and a first terminal 60 of the bypass actuator 42. The bypass switch 40 is preferably a momentary switch, such that the switch 40 only provides a conductive path while it is being activated by an operator. Such a momentary switch typically has a spring-loaded return, such as a spring-return push-button, toggle, or rocker switch. The bypass actuator 42 is preferably a relay which closes a contact to establish the bypass path 44 between the second terminal 58 of the selector switch 20 and the first terminal 45 of the first actuator 46. A latching signal 62 is connected between the bypass path 44 from the first terminal 45 of the first actuator 46 to the first terminal 60 of the bypass actuator 42.

The first actuator 46 selectively connects the auxiliary member of the vehicle to the dc voltage source 50. A first terminal 45 of the first actuator 46 is connected to both the interlock path 28 and the bypass path 44. The first actuator is preferably a relay which closes a contact to establish an auxiliary power path 64 between the dc voltage source 50 and the auxiliary member.

In operation, an operator positions the vehicle at a work site and extends the stabilizing members, as required. The stabilizing members may be controlled individually; controlled in pairs, for example front and back or each side; or controlled as one unit. Similarly, the interlock means 14 may selectively permit operation of the auxiliary member if only a front, rear, or side pair of stabilizing members are extended. Alternately, the interlock means 14 may require that all of the stabilizing members are extended before allowing operation of the auxiliary member. Further, the operating mode of the stabilizer members may be selected by another switch which may also be used by the interlock means.

When the vehicle has been positioned and the stabilizing members extended, the operator commands the auxiliary member to enable using the enabling means 12. During normal operation, each of the stabilizing members has been properly extended and the interlock means 14 will establish the conductive interlock path 28 between the selector switch 20 and the first actuator 46. The first actuator 46 will activate and establish the auxiliary power path 64 between the dc voltage 50 and the auxiliary member. However, if one of the stabilizing members has not been properly extended or some other failure prevents the interlock means 14 from establishing the interlock path 28, the bypass means 16 may provide an alternate path to enable the auxiliary member.

The operator may selectively over ride the interlock in order to enable the auxiliary member by activating the bypass switch 40. If the selector switch 20 is closed, closing the bypass switch 40 will energize the bypass actuator 42. The bypass actuator 42 latches itself on by providing a latching signal 62 between the first terminal 45 of the first actuator 46 and the first terminal 60 of the bypass actuator 42. Therefore, the bypass switch 40 may be opened but the bypass actuator 42 will remain energized. The bypass actuator 42 remains energized until the selector switch 20 is opened, removing the conductive path between the voltage source 50 and the first terminal 60 of the bypass actuator 42.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

I claim:

1. An interlock device on a mobile vehicle having an auxiliary member, which extends away from the vehicle, and at least one stabilizing member, comprising:
- an enabling means for selectively enabling and disabling the auxiliary member;
- an interlock means for selectively preventing the auxiliary member from being enabled;
- and a bypass means for selectively over riding the interlock means wherein the bypass means is reset when the enabling means disables the auxiliary member.

2. The interlock device of claim 1 wherein the enabling means further comprises a selector switch to enable and disable the auxiliary member.

3. The interlock device of claim 1 wherein the interlock means further comprises a sensor associated with each of the stabilizing members providing a signal indicating the stabilizing member is in an operative position.

4. The interlock device of claim 3 wherein the interlock means further comprises at least one relay, each relay corresponding to and enabled by one of the signals from each of the sensors wherein each relay is connected in series with the other relays such that a first conductive path is established when all of the stabilizers are in the operative position.

5. The interlock device of claim 1 wherein the interlock means further comprise at least one switch, each switch associated with one of the stabilizing members wherein each switch is closed when the stabilizing member is an operative position.

6. The interlock device of claim 5 wherein each switch is connected in series with the other switches such that a first conductive path is established when all of the stabilizers are in the operative position.

7. The interlock device of claim 5 wherein the bypass means further comprises:
- a bypass switch to selectively enable the bypass means if the enabling means is selected to enable the auxiliary member; and
- a bypass relay to provide a second conductive path parallel to the first conductive path.

8. The interlock device of claim 7 wherein:
- the bypass switch is a momentary switch;
- the bypass relay is activated to provide the second conductive path when both the bypass switch and the enabling means are enabled; and
- the bypass relay remains activated until the enabling means is disabled.

9. An interlock device on a mobile vehicle having an auxiliary member, which extends away from the vehicle, and at least one stabilizing member, comprising:

a first switch selectively providing a first signal to at least partly activate or deactivate the auxiliary member;

a sensor associated with each of the stabilizing members to provide a second signal indicating the stabilizing member is in an operative position;

an interlock preventing the first signal from the first switch from enabling the auxiliary member if one of the second signals indicates that one of the stabilizing members is not in the operative position; and an interlock bypass further comprising a second switch providing a third signal to at least partially enable the interlock bypass wherein:

the interlock bypass is enabled if the first switch is selectively providing the first signal to activate the auxiliary member and the second switch is providing the third signal to enable the interlock bypass;

the interlock bypass is disabled if the first switch is providing the signal to disable the auxiliary member; and if the interlock bypass is enabled, the interlock bypass permits the first switch to enable the auxiliary member regardless of the state of the second signals of the interlock.

10. The interlock device of claim 9 wherein the second switch is a momentary switch.

11. The interlock device of claim 10 further comprising a first relay to enable the auxiliary member.

12. The interlock device of claim 11 wherein the interlock further comprises at least one relay, each relay connected to one of the second signals from each sensor.

13. A control circuit for an auxiliary member on an aerial lift truck having an auxiliary member, which extends away from the truck, and at least one stabilizing member selectively extending from the truck and selectively engaging the ground comprising:

a voltage source providing a dc voltage;

a first switch connected in series with the voltage source;

an interlock switch associated with each of the stabilizing members, each interlock switch indicating when the stabilizing member is substantially engaging the ground wherein each interlock switch is connected in series with the other interlock switches to provide an interlock path, the interlock path connected in series with the first switch;

a first actuator connected in series with the interlock path selectively providing power to the auxiliary member of the aerial lift truck; and a bypass circuit connected in parallel with the interlock path further comprising:

a bypass switch connected in series with the first switch; and a bypass actuator selectively providing a bypass path parallel to the interlock path between the first switch and the first actuator, wherein:

a first terminal of the bypass actuator is connected in series with the bypass switch and a latching signal is connected between the bypass path and the first terminal of the bypass actuator to keep the actuator activated until the first switch is opened.

* * * * *